United States Patent [19]

Rifflart

[11] 4,119,155
[45] Oct. 10, 1978

[54] AGRICULTURAL MACHINE WITH FOLDING ROTATABLE SECTIONS

[75] Inventor: Jacques Rifflart, Arras, France

[73] Assignee: CER, France

[21] Appl. No.: 728,967

[22] Filed: Oct. 4, 1976

[30] Foreign Application Priority Data

Oct. 10, 1975 [FR] France .................. 75 31329
May 10, 1976 [FR] France .................. 76 14526

[51] Int. Cl.² ............................................. A01B 73/00
[52] U.S. Cl. ................................................ 172/311
[58] Field of Search .................. 172/311, 456, 662; 56/228, 385; 411/411 R, 411 A, 412, 413

[56] References Cited

U.S. PATENT DOCUMENTS

| | | | |
|---|---|---|---|
| 2,970,658 | 2/1961 | Kopaska | 172/456 |
| 3,414,064 | 12/1968 | Foster | 172/311 |
| 3,491,836 | 1/1970 | Doepker | 172/311 |
| 3,502,154 | 3/1970 | Rogers | 172/311 |
| 3,606,848 | 9/1971 | Dobbs et al. | 172/456 X |
| 3,637,027 | 1/1972 | Kovar | 172/311 |
| 4,042,044 | 8/1977 | Honnold | 172/311 |

*Primary Examiner*—Richard T. Stouffer
*Attorney, Agent, or Firm*—Robert E. Burns; Emmanuel J. Lobato; Bruce L. Adams

[57] ABSTRACT

An agricultural machine is disclosed comprising a central main frame and laterally extending sections articulated to the main frame, both the main frame and the lateral sections being adapted to mount agricultural tools. The arrangement for articulating the lateral sections to the main frame includes structure for rotating the lateral sections about an axis extending transversely of the central frame as well as structure for pivoting the lateral sections about an axis at right angles to the first axis so that the lateral sections can be moved from an outwardly extending working position to an inwardly folded road travel position in which the lateral sections are stowed alongside the main frame.

3 Claims, 8 Drawing Figures

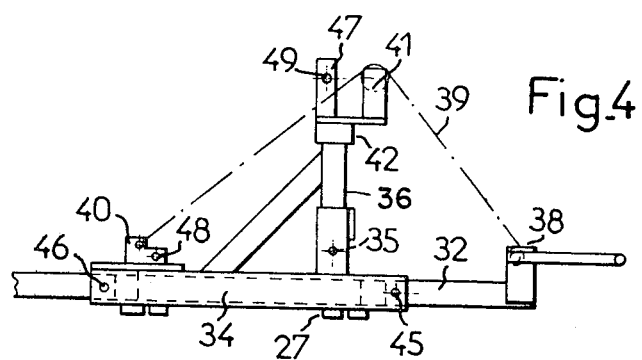
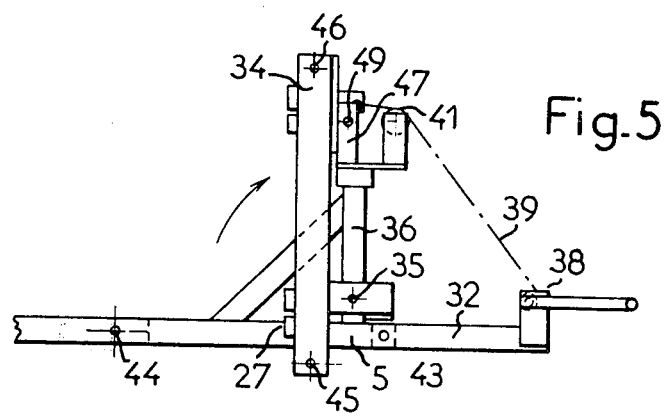
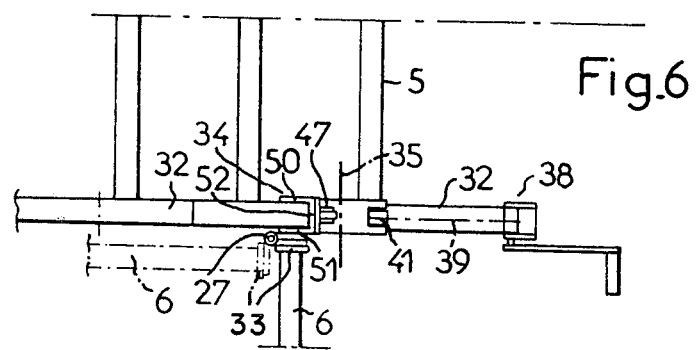

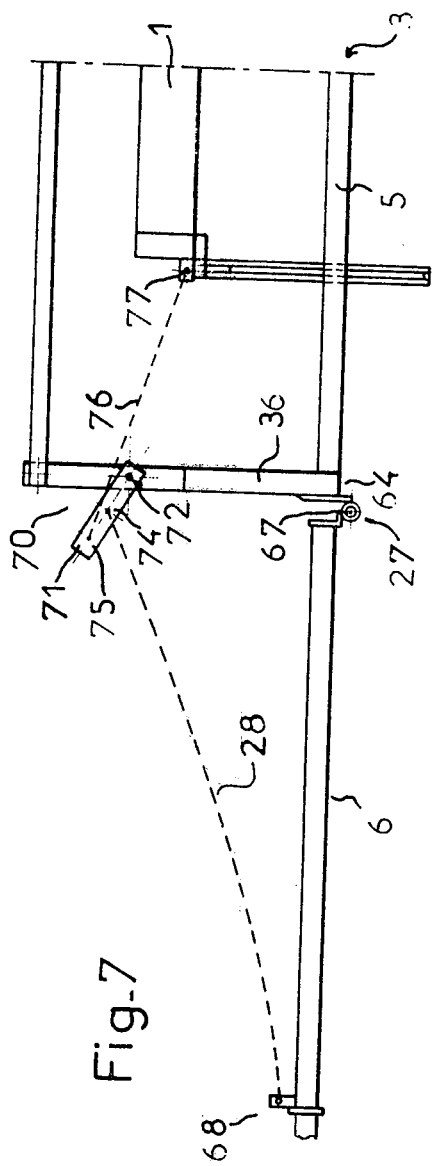
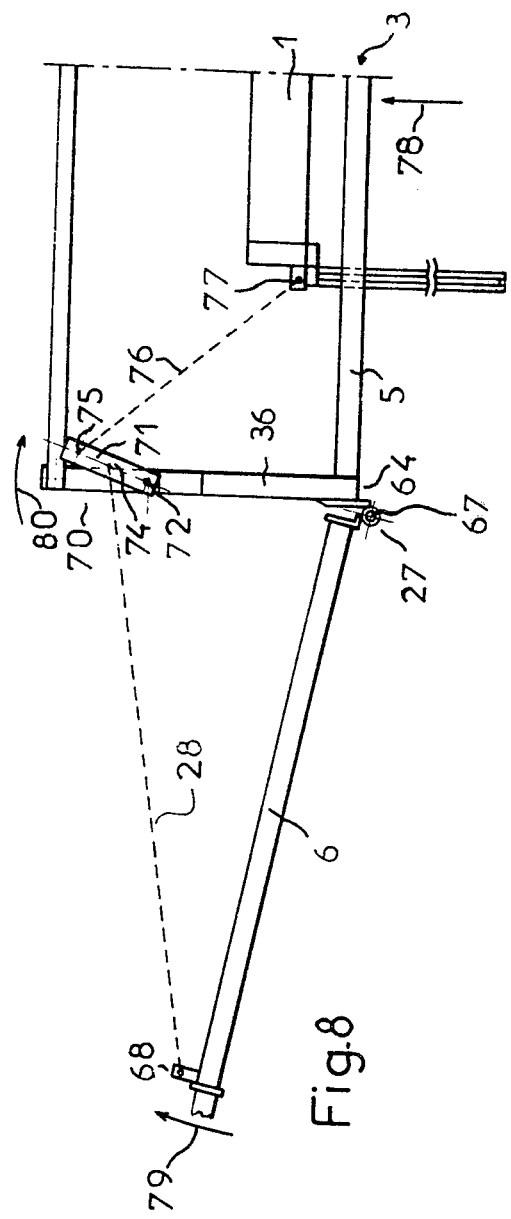

AGRICULTURAL MACHINE WITH FOLDING ROTATABLE SECTIONS

BACKGROUND OF THE INVENTION

This invention relates to an agricultural machine having a wide spread which can be reduced in width, the machine being capable of carrying out multiple agricultural operations by adaptation of different working tools.

It is known that there are in existence numerous different types of agricultural machines, generally intended to be coupled to the back of a tractor which moves them along; these machines can be carried by the tractor itself, or again they may be in the form of trailers or semi-trailers coupled behind the tractor.

Mention may be made notably of equipment for preparing the soil such as cultivators, harrows, vibro-cultivators, or of equipment for injecting fertilizer into the soil, or again of machinery such as a seed drill or a stubble plough, or of machinery for atomising insectiside; this list is of course not by any means complete.

In their present form of embodiment, these items of agricultural machinery suffer from a disadvantage in that it is difficult to connect more than one of them simultaneously to the tractor and in that the application of several different treatments to a single area of ground requires a number of passages with the corresponding different items of machinery.

A second disadvantage of the items of agricultural machinery as at present known lies in their low width or spread, which enables only a relatively narrow band of ground to be treated at each pass; in fact, such items of machinery also have to be capable of moving by road when being transferred from one field to another or from the field to the garage or shed.

Moreover, the narrower the width of the band of ground treated in one pass of the equipment, the greater will be the number of outward and return journeys of the tractor and of the item of machinery required to complete the treatment of a field.

SUMMARY OF THE INVENTION

Faced with this present state of the art, the objective of the present invention is to propose a new type of machine adapted to enable the number of passes required for the treatment of a field to be reduced, by permitting the simultaneous application of a maximum number of treatments to one band of ground, which is as wide as possible, at each pass of the machine. Another objective of the present invention is to make the machine compatible with the requirements for normal road traffic, with an easy and rapid change-over from the working position to the travelling position and vice versa, that is to say from a maximum spread to a minimum spread and vice versa.

Comprising essentially a longitudinal load-bearing or semi-load-bearing chassis and a transverse frame, the level of which can generally be adjusted relative to that of the chassis, the machine according to this invention can effectively be equipped, depending upon the various cases simultaneously or separately, with numerous types of different tools intended for working the ground, these tools being preferably removable.

Such a machine possesses the advantage of being capable of use throughout the entire year for different types of work, by varying the equipment fitted to it.

The increase of the working capacity of the machine by comparison with conventional machines is ensured by an increase in the spread of the frame, which can extend, for example, to about 14 meters, and by the increase in the longitudinal dimension of this frame.

In order to enable the spread of the frame to be reduced when required to a size compatible with travel by road under normal conditions, the frame is constructed, according to this invention, in the form of two lateral sections articulated on a central section of fixed orientation, in such a way that it is possible to bring each of these lateral sections into a travelling position, in which it is folded into a longitudinal position along the chassis of the machine, and in which the tools carried by this lateral section are preferably oriented towards the chassis; by means of a suitable design of these articulations or hinges, it is thus possible to reduce the spread of the machine to a dimension, in practice for example of the order of 3.30 meters, which is quite compatible with the requirements of road traffic, and the dismantling movement, like the movement for restoring it into the working position, can be carried out by a single man in a short time; in particular, it is not necessary to remove the tools carried by the lateral sections of the frame when the machine is brought into the road position, since these tools are then turned towards the chassis of the machine and do not constitute any dangerous projection towards the outside.

The judicious design of the articulations or hinges of the transverse frame of the machine according to this invention also makes possible, when the machine is in the operating position, a slight deflection of the lateral sections upwards or downwards relative to the central section, which in the first place enables the tools to follow more effectively the irregularities of the ground in spite of the wide spread of the machine, and secondly enables the lateral sections to be rapidly raised, for example in order to facilitate turning of the machine at the end of the field. The machine according to this invention is therefore especially convenient to tow and to maneuvre, in spite of its large working width.

The agricultural machine according to this invention, capable of moving in a predetermined direction, is characterized in that it comprises:

a chassis oriented longitudinally with respect to the direction of movement and equipped with means for supporting the machine, a transverse frame comprising a central section and two lateral sections, respectively on either side of the central section, the central section being rigidly connected to the chassis, a plurality of tools integrally attached to the sections of the frame and disposed below the frame along at least one transverse line, and articulation means connecting the lateral sections to the central section, permitting the rotation of each lateral section around a first transverse axis between a working position in which the tools are directed towards the ground and an intermediate position in which the tools are oriented longitudinally, and permitting the rotation of each lateral section about a second axis situated in a longitudinal plane substantially perpendicular to said first axis, from said intermediate position into a road-travelling position, in which the lateral sections are folded into a longitudinal position along the chassis.

BRIEF DESCRIPTION OF THE INVENTION

The invention will be better understood if reference is made to the description below, which relates to a non-limiting form of embodiment, and to the attached drawings, which form an integral part of this description.

Figure 3:
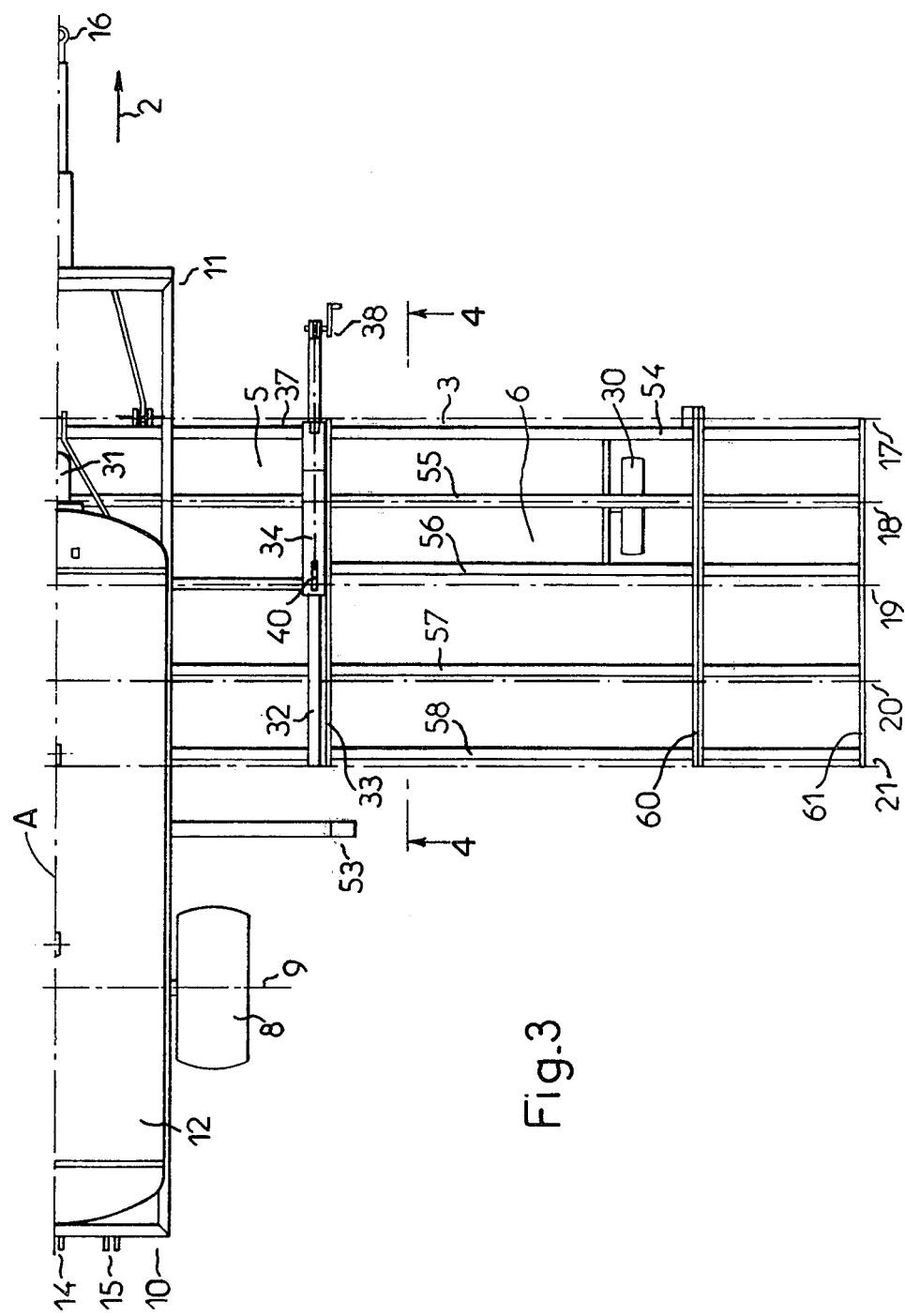
FIG. 3 shows a half-plan on the machine from above in the working position.

FIG. 4 diagrammatically shows a detail in a view taken along lines 4—4 in FIG. 3 and with certain parts omitted.

FIG. 5 similarly shows an analogous view, in an intermediate position or in a road position.

FIG. 6 similarly shows a view from above of the device as it appears in FIG. 5, in the intermediate position, the road position being shown diagrammatically by dot-and-dash line.

FIGS. 7 and 8 similarly show half-views from the front of the machine, respectively in a working position and in a maneuvering position.

DESCRIPTION OF THE PREFERRED EMBODIMENT

Figure 1:
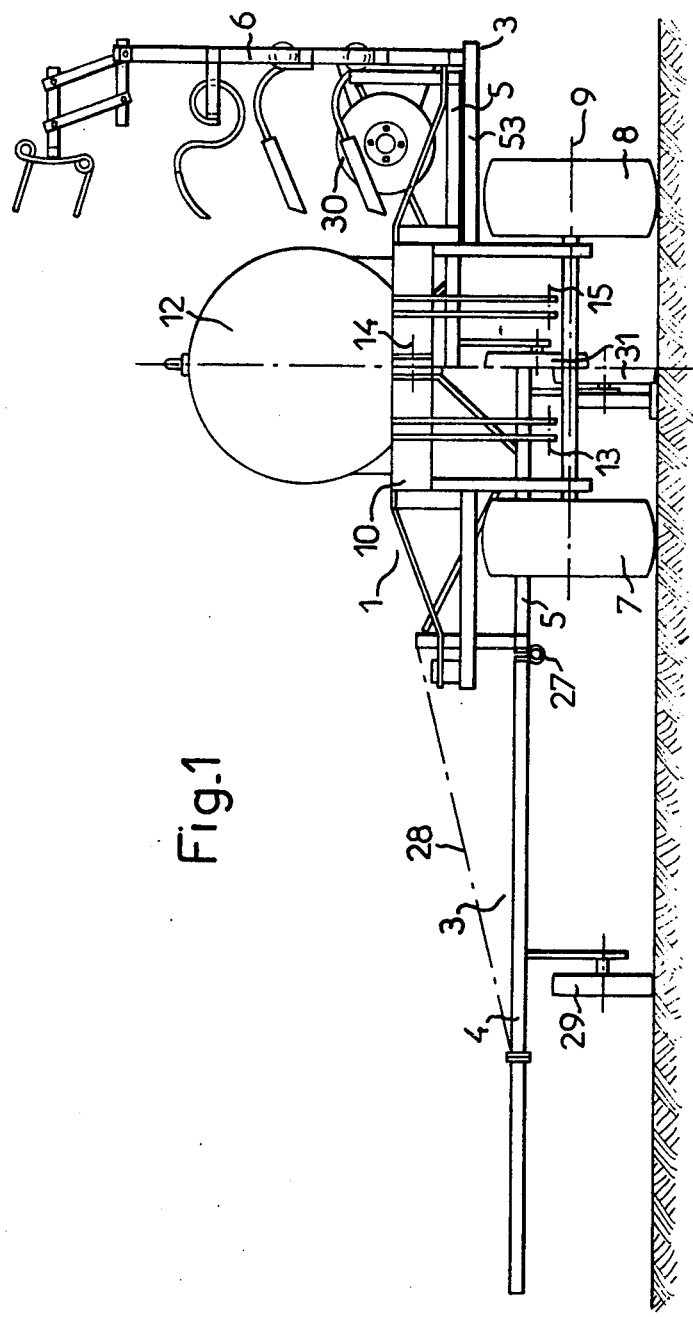
FIG. 1 shows a rear view of a machine according to this invention, in the working position in the left part of the figure and in the road position in its right part.
Figure 2:
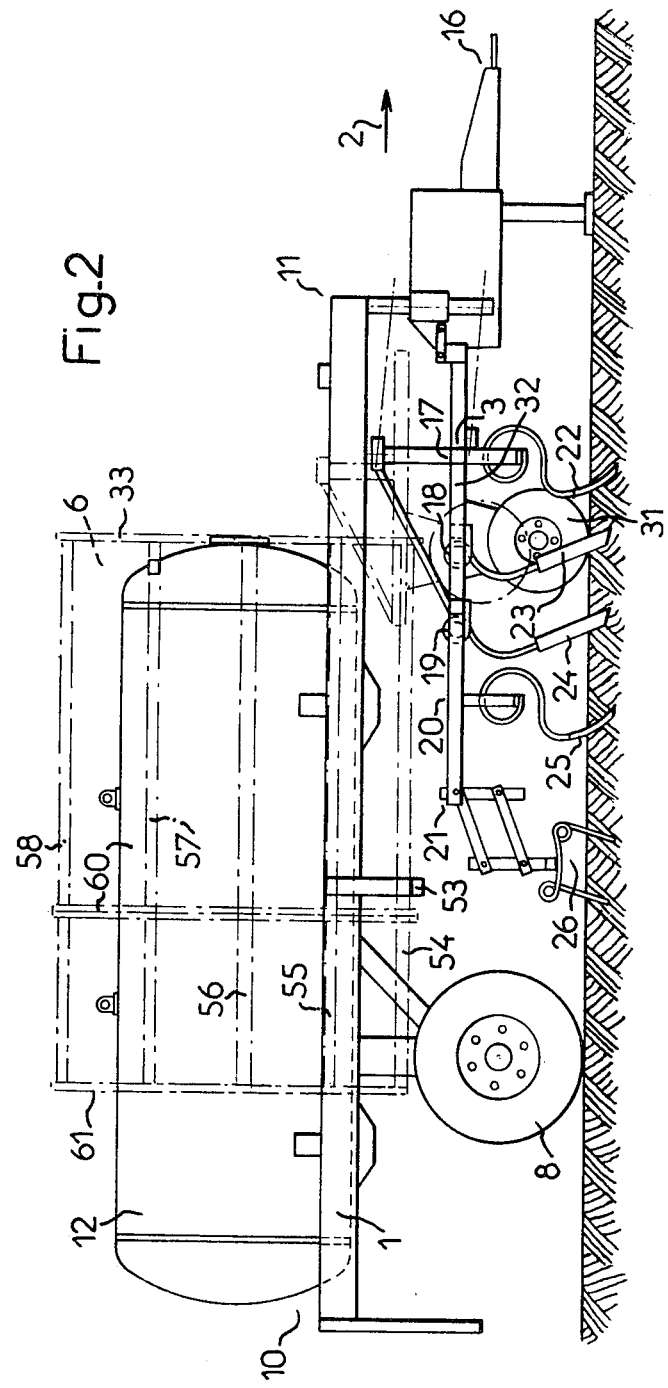
FIG. 2 shows a lateral view of the machine in the working position, the road position being shown diagrammatically in dot-and-dash line.

FIGS. 1 to 3 show a machine according to this invention, which comprises essentially a chassis 1 having a longitudinal axis A oriented in the direction of movement 2 of the machine, in practice the direction of movement of the tractor to which it is coupled, and a transverse frame 3, formed of three articulated sections 4 to 6.

The chassis 1 may be independent (load-bearing) and, where applicable, may be self-propelled or, as in the example illustrated, may be a semi-trailer: in this case, it comprises two wheels 7 and 8, mounted on an axis 9 fixed relative to the chassis 1, and disposed near to its rear end 10; close to its front end 11, the chassis 1 rests upon a member integral with the tractor, for example on the coupling hook, by the intermediary of coupling means 16 of any appropriate type.

The chassis 1 may carry a storage container, such as a tank or a hopper, for solid, liquid or gaseous substances intended to be spread by the tools carried by the machine; in the present case, a tank 12 has been shown, intended for receiving, for example, a liquid fertilizer intended to be introduced into the ground by teeth. The tank 12 could be used for other purposes for example for supplying an atomizer sprinkler pipe disposed transversely at the rear of the chassis 1. In fact, the chassis 1 of the machine is designed to receive, for example at its rear part 10, various agricultural tools or implements and notably those which do not require an adjustment in level, such as atomising sprinkler pipes and the like. At the rear 10 of the chassis 1, provision may be made for a 3-point fixing 13-14-15, of conventional type, for example with level adjustment, which enables any of the accesscries normally provided for attachment to a tractor to be attached here.

Below the frame 3, the machine is equipped to receive in a removable manner a large number of like or unlike tools.

In the example illustrated, the frame 3 thus comprises, from front to rear along the transverse lines with respect to the general direction of the machine, vibrating teeth 22, injection teeth 23 and 24, disposed in staggered array, vibrating teeth 25 analogous to the teeth 22 and a harrow 26. These accessories are fixed on horizontal bars disposed beneath the three sections of the frame and connected to these sections through the intermediary of vertical slides which enable the positions of these tools to be adjusted and fixed one relative to the other and relative to the ground.

This equipment may be completed, for example, at the rear of the chassis 10 by a third line of vibrating teeth followed by a second harrow (not shown).

It can also be completed or replaced by any other tool, and notably by any other tool, the level of which relative to the soil must be controlled. Mention may be made notably of equipment for the preparation of the soil such as cultivators, harrows, or vibro-cultivators, or again of items of machinery such as a seed drill or a stubble-plough, that is to say in practice the majority of tools of conventional agricultural machinery.

To enable it to receive a maximum number of tools, while at the same time possessing the necessary rigidity and a degree of lightness which facilitates maneuvering, each section 4 to 6 of the frame is formed of stringers such as 54 to 58 normally transverse of motion 2, as shown in FIG. 2 and of a plurality of transverse members such as 33, 60, 61 integrally connected to these stringers transversely thereof, and accordingly normally longitudinal of this motion. The means of attachment for the various types of tools are generally carried by the stringers, which extend along transverse lines 17 to 21.

In order to ensure that the level of the frame 3 and of the tools which it carries are as constant as possible from one transverse end to the other of this frame, in spite of its wide spread and of inevitable irregularities in the ground surface, each lateral section 4, 6 is articulated onto the central section 5 by means of hinges 27 (see also FIG. 4), each of which permits, when the machine is in the operating position, a relative rotational movement about a substantially horizontal, generally longitudinal axis; this deflection is limited in a downward direction for the sections 4 and 6 by flexible ties such as chains 28, connecting a zone of each lateral section situated beyond its hinge relative to the central section to at least one zone of this central section situated at a higher level. The adjustment of the level of each lateral section 4 and 6 relative to the ground is ensured by wheels, respectively 29 and 30, which rest on the ground when the machine is in the operating position; the central section 5 also comprises a wheel 31, resting constantly on the ground when the machine is in operation, the section 5 being connected to the chassis 1 by means such as deformable parallelograms which enable it to deflect vertically without however permitting a transverse deflection; means are provided for retracting this wheel 31 when the machine is in the road-travelling position; these means may with advantage act by raising the central section 5 relative to the chassis 1 and may consist, for example, of jacks or of a winch.

According to the preferred form of embodiment illustrated notably in FIGS. 7 and 8, which show the articulation of the lateral section 6 to the section 5, the tie 28 is also used for causing rotation, when desired, of the lateral sections such as 6 upwards about the axis such as 67, defined by the hinge 27 which articulates to the central section 5, particularly for the purpose of retracting the lateral sections during maneuvres.

For this purpose, the tie 28 is not fixed directly at 70 to an element integral with the central section 5, but it is fixed by its end to a yoke 71, itself mounted to rotate about an axis 72 on a mast 36 integral with the central section 5 at the lateral edge 64 of the central section, at which the lateral section under consideration 6 is articulated, and forming a projection above this central section.

The yoke 71 is here designed and articulated on the mast 36 in such a way that its axis 72 is situated, regardless of the position which it adopts during its pivoting, at a level lower than that of the point 74 at which the tie 28 is attached to the yoke 71; at a point 75 of the yoke, situated beyond the point 74 relative to the axis 72, there is fixed a second tie, rigid or flexible, 76, which is also fixed to the chassis 1 at a point 77 of this chassis which is always situated below the point 75; the tie 76 is always tensioned between the points 75 and 77.

In the operating position, shown in FIG. 7, the yoke 71 forms a projection towards the section 6 with respect to the vertical mast 36 and with respect to the central section 5, the arrangements of the entire assembly being such that its articulation axis 72 is situated below the line joining the points 75 and 77 for fixing the second tie 76; the flexible tie 28 may be just slack or, at the limit, may be tensioned between the point 74 of the yoke and the zone 68 of the lateral section, where it is attached to this lateral section.

When, by utilizing the appropriate means referred to above, lifting of the central section 5 relative to the chassis 1 is caused, as indicated diagrammatically by the vertical arrow 78 in FIG. 8, the second tie 76 tends to pull the yoke 71 towards the space situated vertically above the central section 5, between the two vertical masts such as 36, the point of fixing 77 of the tie 76 to the chassis 1 being itself situated in an intermediate zone between the articulations of the two lateral sections on the central section.

This movement is illustrated in FIG. 8, in which the yoke 71 is rotated towards a position above the central section 5 with respect to the vertical mast 36. It first causes the tensioning, if required, of the flexible tie 28, then the raising of the end zone 68 of the lateral section 6 by a rotation of this section upwards about the axis 67, indicated diagrammatically by arrow 79; the movement of the yoke is indicated diagrammatically by an arrow 80.

It will be understood that the tools which were in contact with the soil or penetrated into it rise further at the end of each lateral section than at the central section, which permits easy maneuvering of the machine even in conditions where the ground is uneven.

Other methods of retracting the lateral sections upwards could be envisaged. The tie for retracting the lateral sections upwards to permit maneuvres could be different from the tie which limits their downward deflection in the working position.

The two ties 28 and 76 are preferably flexible, but one at least of them could be rigid and articulated at its two ends to other members of the machine. The ties 28 and 76 could also be formed in the form of a single flexible tie, changing its direction at a point on the vertical mast 36 situated above the articulation axis 67, for example, by means of a pulley having its axis parallel to the general direction of the chassis 1.

To permit a reduction in the spread of the machine, the lateral sections 4 and 6 are articulated on the central section 5, which is fixed in its orientation relative to the chassis, through the intermediary of means permitting the rotation of each lateral section about a predetermined transverse axis, between a working position in which the teeth such as 22 to 25 are pointing towards the ground and an intermediate position in which these teeth are oriented longitudinally. The rotation of the lateral sections about a second axis situated in a longitudinal plane perpendicular to the first transverse axis permits the passage from the intermediate position to a road-travelling position, in which the sections 4 and 6 are folded along the chassis 1. Preferably, the teeth or the tools with which the sections 4 and 6 are equipped are then turned inwards towards the chassis 1 and towards the storage vessel 12.

These means will now be described with reference to FIGS. 4 to 6, which show that the lateral section 6 (FIG. 6) possesses a rigid member 33 connected by the hinges 27 to an intermediate member 34 rotationally mounted relative to the central section 5 about an axis 35, transverse of axis A. This arrangement enables the axis of the hinge 27 to be caused to pivot in a longitudinal plane perpendicular to this axis 35, between the working position in which the hinges 27 are horizontal and longitudinal and an intermediate and road-travelling position in which they are vertical.

In the example illustrated (FIGS. 4, 5), the axis 35 is constituted of a transverse horizontal aperture formed in the vertical mast 36 which is integrally attached to a longitudinal member 32, itself integral with the central section 5 of the frame and extending, over a portion of its length, alongside the rigid member 33 of the lateral section 6 when this section is in the working position. This mast 36 is situated above the member 32, close to the front edge 37 of the frame (FIG. 3), which is common to the central section 5 and to the two lateral sections 4 and 6 when in the operating position.

As may best be realized from FIG. 5, the axis 35 is situated in front of the center of gravity of the section 6 when this is in the road-travelling position; unintentional tilting of the section 6 towards the back by pivoting about the axis 35, as a consequence of its weight, is prevented by the fact that the member 34 possesses, preferably behind the axis 35, an inverted U-shaped cross-section which hugs the member 32 over a portion of its length.

The passage from the working position to the road position is effected by upward rotation, about the axis 35 in the direction of the arrow in FIG. 5, of the zone of the member 34 situated behind the axis 35. This rotation can be produced by any suitable means, such as hydraulic, pneumatic or hydro-pneumatic jacks, or for example by means of a winch 38 mounted on the member 32 in front of the mast 36. This winch exerts an upward pull on the zone of the member 34 situated behind the axis 35, through the intermediary of a flexible tie 39, connected to a member 40 integral with the member 34 in said zone. The tie 39 is deflected between the winch 38 and the member 40 by a pulley 41 mounted at the upper end 42 of the mast 36.

In each of the extreme positions, the member 34 is immobilized by pinning it respectively to the member 32 and to the mast 36; orifices 43, 44 and 45, 46 enable the member 34 to be pinned to the member 32; the member 40 integral with the member 34 and a yoke 47 integral with the upper end 42 of the mast 36 and receiving the member 40 in the position illustrated in FIG. 5, are also perforated by orifices 48 and 49, which permit the members to be pinned together when the member 34 is in a vertical position.

Dismantling of the lateral sections of the machine is carried out in the following manner:

A first operation consists of bringing the entirety of the frame 3, by raising its central section 5, to a high position in which the tools and wheels 29 to 31 are no longer in contact with the ground. After this operation, as when the machine is in the operating position, the member 34 bears on the member 32, to which it is also pinned.

The member 34 is then unpinned and, by means of the winch 38, it is caused to rotate about the axis 35 so as to bring it progressively into a vertical position, such as illustrated in FIG. 5, in which position it is then pinned to the yoke 47 of the mast 36. On the member 34, the axis 35 is constituted, for example, by an extension of the two flanges 50 and 51 of the U-section beyond the web 52 of that section, these extensions being perforated in a suitable manner opposite to the mast 36 to receive a common shaft.

At the end of this operation, the member 34 is in a substantially vertical position as also is the lateral section 6, which however still maintains a transverse orientation with respect to the general direction of the machine. This intermediate state is illustrated notably in FIG. 6, in full lines. The tools carried by the section 6 are now pointing towards the rear.

Starting from this position, a rotation of the lateral section 6 about the hinge 27 and towards the rear is now caused, which brings it into the position illustrated in broken lines in FIG. 6 and in full lines in the right-hand half of FIG. 1. Preferably, the chassis 1 is equipped at the side with projecting members such as 53, on which the section 6 now rests, for example by its edge corresponding to the front edge 37 of the frame 5. The projecting members such as 53 preferably possess means for immobilizing the section 6 in its folded-back position; these means may consist, for example of an U-shape, open towards the outside, inside which a member 54, defining the front edge 37 of the frame 3 in its section 6 can engage; the immobilization can be ensured, for example, by pinning.

It may be noted that the various operations leading to this folding-back can be carried out by a single man, permitting a rapid passage from the working position to the road-travelling position, this being achieved without removing the tools carried by the sections of the frame. The adjustments and settings of these tools are thus preserved and, consequently, the restoring of the machine to its operating condition is still more rapid.

I claim:

1. An agricultural machine, comprising;
a chassis having a longitudinal axis and having means for supporting the chassis on a generally flat ground for travel along the longitudinal axis;
a frame having a central section mounted on a non-rotatably secured to the chassis, having two lateral sections pivotably supported on mutually opposite lateral portions of the central section to extend in normal use transversely of the axis, and having a plurality of agricultural tools secured to the several sections at locations spaced from the axis to contact the ground in said normal use, said lateral sections being generally longitudinally coextensive with said central section;
first articulation means for permitting rotation of each lateral section with respect to said central section between a working position thereof for said normal use, in which the respective agricultural tools extend down from the section for said contacting of the ground, and an intermediate position in which said tools extend parallel to the longitudinal axis, to effect the pivotable supporting of the lateral sections on the central section, the first articulation means comprising two rigid members parallel to the longitudinal axis and means for mounting each member on the central section to permit rotation of the member with respect to said central section about a transverse axis;
second articulation means for permitting rotation of each lateral section with respect to said central section between the intermediate position thereof and a folded position for road travel, in which folded position the lateral sections extend parallel to the longitudinal axis, the second articulation means comprising a pivot for each lateral section, each pivot being mounted on one of the rigid members and parallel thereto; and
means for effecting said rotations.

2. An agricultural machine, comprising;
a chassis having a longitudinal axis and having ground contacting means for supporting the machine for travel along said axis;
a frame mounted on and extending transversely of the chassis, the frame having a central section disposed on and secured to the chassis, the frame also having two lateral sections, respectively extending from and movably supported by mutually opposite portions of the central section, and having a plurality of agricultural tools secured to the several sections and disposed below the frame along at least one transverse line,
first articulation means for the movable supporting of the lateral sections on the central section to permit rotation of each lateral section about a first transverse axis between a working position in which the respective tools are directed towards the soil and an intermediate position in which said tools are oriented longitudinally of the chassis, said first articulation means comprising two rigid members, each supporting one of the lateral sections, and means for mounting each rigid member to permit said rotation of the section;
second articulation means mounted on each rigid member for the movable supporting of the respective lateral section on the rigid member to permit rotation of the lateral section about an axis disposed in a longitudinal plane substantially perpendicular to the transverse axis, from the intermediate position to a folded position for road travel and in which the lateral section extends longitudinally along the chassis;
pivot means for permitting independent turning of each lateral section, relative to the central section, about a longitudinal axis, the frame being vertically adjustable relative to chassis;
means for synchronizing the independent turning with the vertical adjusting of the frame.

3. A machine according to claim 2, wherein the means for synchronizing comprise:
(i) a movable element articulated about a longitudinal axis on the central section, (ii) at least one tie connecting a zone of each lateral section situated beyond its articulation to the central section to a zone of the movable element situated at a level above said zone of the section, and
(iii) at least one second tie connecting a second zone of the movable element, situated on the same side as the first zone with respect to the articulation of said movable element on the central section, to a fixed point on the chassis situated at a level below said second zone of the movable element.

* * * * *